(12) United States Patent
Geidek et al.

(10) Patent No.: US 9,423,100 B2
(45) Date of Patent: Aug. 23, 2016

(54) RADIATING ELEMENT FOR FOCUSSED ENERGY

(75) Inventors: Franz Geidek, Aresing (DE); Rudolf Protz, Hoehenkirchen-Siegertsbrunn (DE); Juergen Zoz, Freidberg (DE); Norbert Nissl, Langenmosen (DE); Anita Kehl, legal representative, Langenmosen (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 185 days.

(21) Appl. No.: 14/008,930

(22) PCT Filed: Mar. 16, 2012

(86) PCT No.: PCT/DE2012/000288
§ 371 (c)(1),
(2), (4) Date: May 20, 2014

(87) PCT Pub. No.: WO2012/130211
PCT Pub. Date: Oct. 4, 2012

(65) Prior Publication Data
US 2014/0307440 A1    Oct. 16, 2014

(30) Foreign Application Priority Data

Apr. 1, 2011 (DE) .......................... 10 2011 015 779

(51) Int. Cl.
| | | |
|---|---|---|
| G02B 27/14 | (2006.01) | |
| F21V 7/06 | (2006.01) | |
| F21V 7/00 | (2006.01) | |
| B23K 26/06 | (2014.01) | |
| F41H 13/00 | (2006.01) | |
| H01S 3/00 | (2006.01) | |

(52) U.S. Cl.
CPC ........... *F21V 7/0025* (2013.01); *B23K 26/0608* (2013.01); *F21V 7/06* (2013.01); *F41H 13/0062* (2013.01); *G02B 27/14* (2013.01); *G02B 27/143* (2013.01); *H01S 3/005* (2013.01)

(58) Field of Classification Search
CPC ............ F41H 13/00; F41H 13/0043–13/0087; F41H 11/02; B23K 26/02; B23K 26/06; B23K 26/0604; B23K 26/0608; G02B 23/06; G02B 26/105; G02B 26/08; G02B 26/0816–26/0866; G02B 5/08; G02B 5/10; G02B 5/136; G02B 7/18; G02B 7/182; G02B 7/1822; G02B 7/1827–7/1828; G02B 7/198; G02B 17/02; G02B 17/06–17/0605; G02B 17/0615–17/0668; G02B 17/0673; G02B 17/0684; G02B 19/0019–19/0023; G02B 19/0033; G02B 19/0047–19/0057; G02B 19/0076; G02B 19/0085; G02B 19/009; G02B 27/0025; G02B 27/0905; G02B 27/0977–27/0988; G02B 27/30; G02B 27/40; G02B 27/1006; G02B 27/1073; G02B 27/1093; G02B 27/14; G02B 27/141; G02B 27/16; G02B 27/143; F21V 7/0025; F21V 7/06

See application file for complete search history.

(56) References Cited

U.S. PATENT DOCUMENTS 3,968,362 A * 7/1976 Mocker ................... G01F 1/661
250/216

(Continued)

*Primary Examiner* — Derek S Chapel
(74) *Attorney, Agent, or Firm* — Crowell & Moring LLP

(57) ABSTRACT

A radiation emitter includes a device for coupling radiation from at least one radiation generator and a radiation combining device that combines the radiation to bundled radiation. The radiation combining device includes a telescopic optic with a collimation reflector and a secondary reflector. The radiation combining device is configured to accept directional radiation from a plurality of light conducting devices from at least one radiation generator.

8 Claims, 2 Drawing Sheets

(56) References Cited

U.S. PATENT DOCUMENTS

Figure 1:
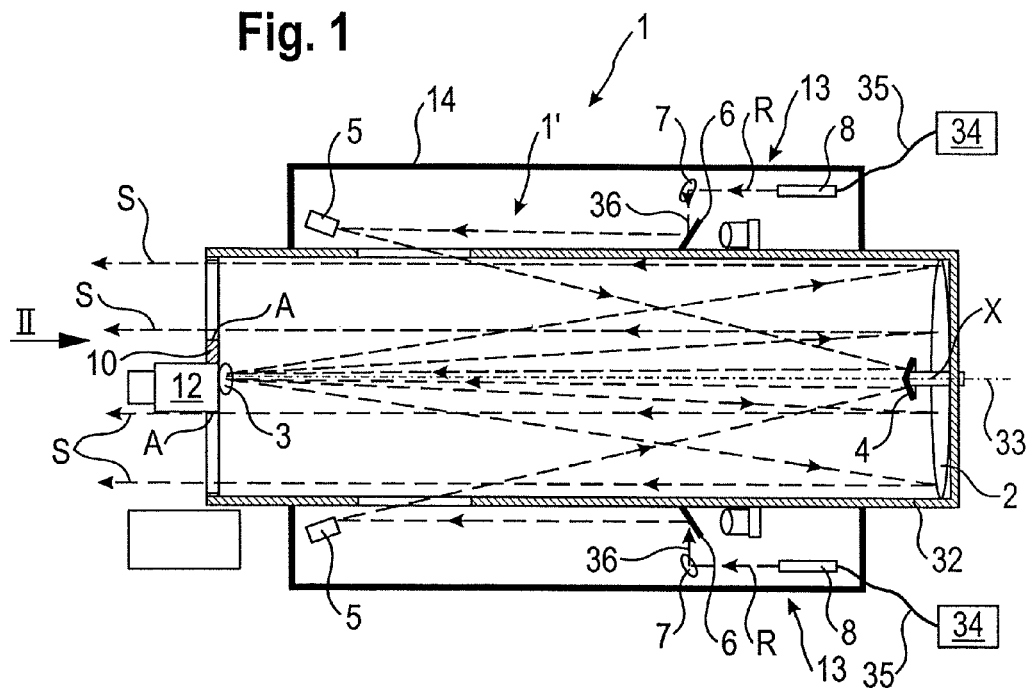

| | | | |
|---|---|---|---|
| 6,934,014 B1* | 8/2005 | Kleinhuber | B23K 26/032 219/121.74 |
| 2003/0141466 A1* | 7/2003 | Ohtomo | G01C 15/002 250/559.38 |
| 2010/0110557 A1* | 5/2010 | Geidek | F41H 13/0062 359/627 |
| 2010/0282942 A1* | 11/2010 | Mosier | F41H 13/005 250/203.2 |

\* cited by examiner

RADIATING ELEMENT FOR FOCUSSED ENERGY

BACKGROUND AND SUMMARY OF THE INVENTION

Exemplary embodiments of the present invention relate to a radiation emitter for directional energy with a device for coupling in radiation from at least one radiation generator and one radiation combining device, which combines the radiation into bundled radiation.

European patent document EP 2182596 A1, assigned to the same assignee as the present application, discloses a radiation emitter for directional energy, which can also be called a tactical radiation emitter or an energy weapon and, for example, can be embodied as a laser weapon.

This known radiation emitter comprises a device for coupling in radiation from at least one radiation generator and one radiation combining device, in order to combine the radiation to a high-energy combined beam. The radiation generator may represent an industrially available laser, with the use of generic laser weapons being seen in the defense against missiles, where here, via a bundled laser beam, thermal impact is applied upon the exterior skin of a missile at long distances of up to several hundred kilometers, allowing the destruction of the missile. An example is here the airborne laser weapon system Boeing YAL-1 of the U.S. Air force.

Another application of such a high energy radiation weapon is in the battlefield at a distance from a few hundred meters to several kilometers. Here, by using the high-energy beam, thermal effects can be applied upon weapons or ammunition rendering them ineffective.

In any case it is required, however, to provide a radiation emitter for directional energy capable of emitting very high radiation and precisely directing it to the target such that the radiation, upon impact on the target object, is still sufficiently high to cause the desired thermal effect.

Successful defense against grenade launchers and similar targets using a high-energy laser weapon requires the generation of a focal point on the target with its intensity exceeding 10 kW/cm2 at a distance from approximately one to approximately three kilometers. In order to fulfill these requirements, the laser weapon needs a laser source with a capacity exceeding 100 kW.

The development of high-energy radiation emitters, for example high energy lasers suitable for such applications, is time-consuming and costly and bears considerable risks for realization.

Lasers are already available for industrial applications, for example laser welding, showing a power of several kilowatts and an almost diffraction limited beam quality (diffraction parameter M2<1.1). This power, which probably can be slightly increased, is far from sufficient to fulfill the requirements of a tactical radiation emitter as explained above, which can apply an effective energy upon an object from over several hundred meters or even several kilometers away.

Exemplary embodiments of the present invention provide a radiation emitter for directional energy, which for manageable costs, allows effective energy to be applied upon a mobile object from a distance of several hundred meters to several kilometers.

Exemplary embodiment of the present invention further provide a radiation emitter for directional energy with a device for coupling in radiation from at least one radiation generator and one radiation combining device, which combines the radiation to bundled radiation, with the radiation combining device comprising a telescopic optic with a collimation reflector and a secondary mirror and the device being embodied for receiving directional radiation from a plurality of light conductors from at least one radiation generator.

The device for receiving directional radiation allows the coupling of high-energy radiation from one or a plurality of preferably commercially available radiation emitters, for example industrially available lasers, which are intended for processing parts and are available at low costs in large numbers. The beams radiation emitted by these radiation emitters is transferred via light conducting devices to a receiving optic of the radiation emitter according to the invention and coupled there. The collimation reflector serves, among other things, for directing the radiation bundled in this fashion to a target object. Additional functions of the collimation reflector are explained in the following and the secondary mirror serves, among other things, for the focusing of the combined beam onto a target object.

The radiation emitter is preferably provided for a spatially largely coaxial coupling in of radiation from at least one high-energy laser light source. For this purpose, optic coupling devices may be provided at the telescopic optic, via which the radiation emitted by one, preferably at least two generators in the form of high-energy directional beams can be coupled in from the end sections of fiber optic conductors. Here, for example, industrial solid state lasers with a wavelength of 1.07 μm can be used as the generators of the high-energy laser beams. This arrangement allows a cost-effective application of commercially available radiation generators and energy to be coupled in the radiation emitter according to the specific energy required respectively for each application by coupling in energy from a plurality of radiation generators.

The radiation emitter according to the invention is preferably embodied to bundle radiation into a parallel beam via a parabolic mirror and for conducting radiation in individual beam axes via a beam splitter to different sub-apertures of the telescopic optic.

In order to combine radiation from several laser beams or radiation energy, the laser radiation emitted from the ends of the above-mentioned fiber optic conductors is bundled via the parabolic reflector into a parallel beam with a small diameter, typically a diameter from one to two centimeters, and directed in the individual beam axes via the beam splitter and particularly additional optic components to different sub-apertures of the telescopic optic.

The beam splitter preferably is a deflector that articulates in two axes, which deflects light in the beam path to Piezo tilting deflectors, preferably rapid-controlled ones tilting about two axes. For this purpose, the radiation emitter preferably comprises, in addition to the beam splitter, at least one deflector that articulates in two axes and a beveled mirror, with the deflector being embodied to deflect radiation in the direction towards the beveled mirror and the beveled mirror being embodied to deflect radiation in the direction towards the secondary mirror.

According to the invention, the secondary mirror is embodied in a displaceable fashion with respect to the collimation deflector along a longitudinal axis of the telescopic optic. The different sub-apertures of the telescopic optic ensure that the radiation is focused coaxially on the target object. The common focusing ultimately occurs by an axial displacement of the secondary mirror with respect to the collimation deflector along a longitudinal axis of the telescopic optic.

In order to align the radiation emitter with its telescopic optic on the target object, it is preferably provided for the radiation emitter to comprise at least a camera and a control device for analyzing image data recorded by the camera and a device for aligning the radiation emitter using a control device and the analyzed image data.

The alignment of the radiation emitter occurs, therefore, based on a camera following the target object and an allocated track electronic. In this way, preferably a first or coarsely adjusted alignment to the target object is yielded detecting the target object.

The invention further provides a laser device illuminating the target object for a fine adjustment of the radiation and/or the radiation emitter to the target object, which emits light with a wavelength different from the wavelength of the radiation of at least one radiation emitter, and the collimation reflector and a beveled mirror are embodied for deflecting laser light reflected by the target object in the direction of the radiation paths of the radiation generator.

Using the illuminating laser, the target object can be irradiated over a relatively large area, the light emitted by the illuminating laser has a wavelength that is different from the wavelength of the radiation emitted by the radiation generator. The light of the illuminating laser reflected by the target object is bundled via the collimation reflector and distributed via the beveled mirror and the reflector, which can tilt about two axes, into the radiation paths of the individual radiation emitters of the radiation generation device.

For a precise alignment of the radiation and/or the radiation emitter to the target object, the radiation emitter preferably comprises at least one position-sensitive detector and/or a camera for recording laser light reflected by the target object and a control device for detecting relative angular misalignments in the radiation paths based on data of the detector and/or the camera and their correction via the reflector and/or the secondary mirror.

The light of the illumination laser reflected into the radiation paths of the radiation emitter is displayed by the above-mentioned beam splitter on the position-sensitive detector and/or a camera. Here, the collimation reflector serves as a receiving optic and ensures, due to its large aperture, high optic resolution and light intensity. This is advantageous, for example, when a camera is used for detecting positions and precise alignment, which may be provided according to the invention.

The detector and/or the camera provide data signals, based on which, via a precise tracking electronic, relative angular misalignments are determined in the individual radiation paths of the high-energy beams, and are corrected by the above-mentioned control device addressing the reflector that can tilt and the secondary mirror, also embodied as a tilting mirror. This control also allows a correction of the angular misalignments generated by atmospheric turbulence effects on the path traveled by the energy radiation to the target object.

According to the invention, at least one laser light source is provided, which emits a laser light beam coupled into the radiation path of the radiation generator, with its progression being detected by the detector and/or the camera for adjusting radiation paths of the radiation generator. For this purpose, in accordance with the present invention the light emitted by the laser light source is different with regards to its wavelength from the wavelength of the radiation of the radiation generator and otherwise follows the radiation path of the radiation of the radiation generator. This way, the laser light used for adjusting and harmonizing individual radiation paths passes the optic path of the effective radiation.

Finally, according to the invention the radiation emitter comprises means for emitting a light beam, directed via a wavelength-sensitive beam splitter to a position-sensitive detector and/or a camera, which can be detected for analyzing an angular misalignment. This light beam can be displayed, similar to the reflected radiation of the illumination laser, via the wavelength-sensitive beam splitter on the position-sensitive detector and/or the camera, and angular misalignments can be calculated therefrom and corrected via tilting reflectors.

BRIEF DESCRIPTION OF THE DRAWING FIGURES

Figure 2:
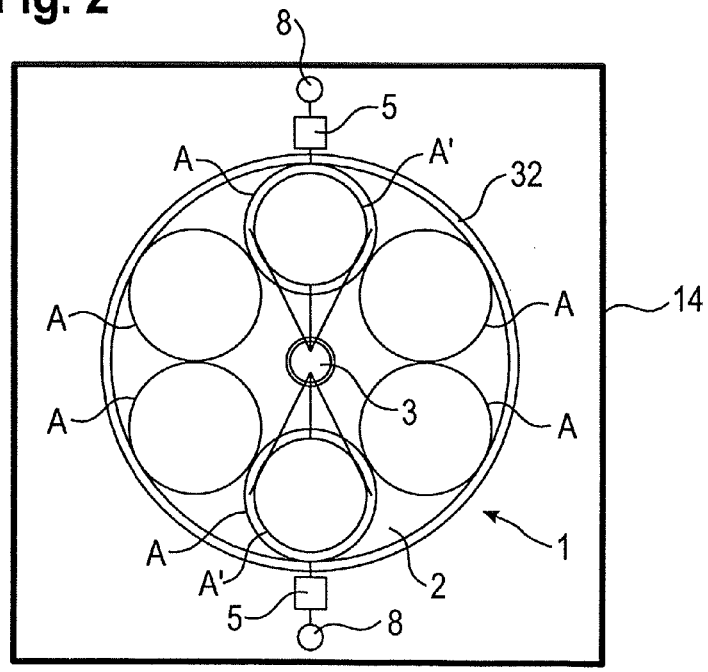
Figure 3:
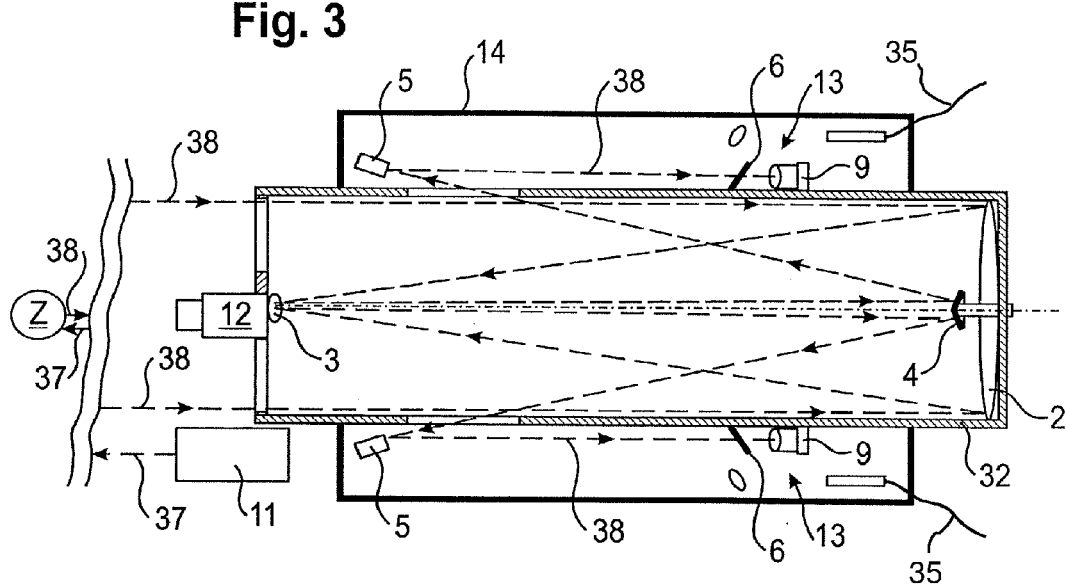
Figure 4:
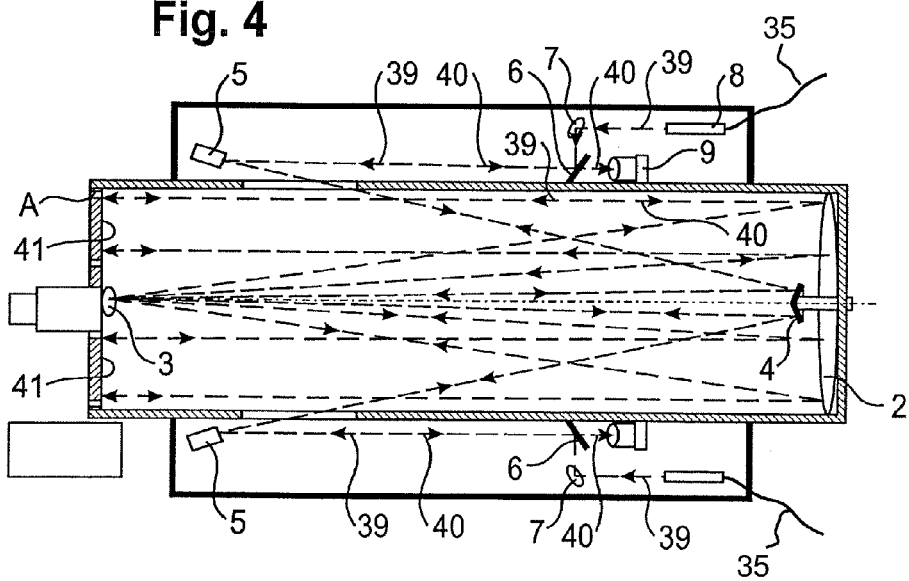

The Drawings Show:

FIG. 1 a schematic illustration of an embodiment of a radiation emitter according to the present invention with a corresponding first radiation progression;

FIG. 2 a top view in the direction of the arrow II in FIG. 1 of the embodiment according to FIG. 1;

FIG. 3 a schematic illustration of an embodiment of a radiation emitter according to the present invention with a corresponding second radiation progression; and FIG. 4 a schematic illustration of an embodiment of a radiation emitter according to the present invention with a corresponding third radiation progression.

DETAILED DESCRIPTION

FIG. 1 of the drawing shows a radiation emitter 1 according to an embodiment of the present invention. The radiation emitter 1 represents a tactical radiation emitter provided for use in the battlefield, for example to fight grenade launchers.

The radiation emitter 1 comprises a radiation combining device 1' with a telescopic optic comprising a primary reflector or a collimation reflector 2, preferably embodied as a parabolic reflector, and a secondary mirror 3. In the embodiment shown the parabolic reflector shows a diameter from fifty centimeters to one hundred centimeters and a focal distance from one hundred to two hundred centimeters.

The secondary mirror 3 is a parabolic reflector showing a diameter from five to ten centimeters and a focal distance from ten to twenty centimeters and forms, together with the collimation reflector 2, the telescopic optic of the radiation emitter 1 according to the invention.

In general, the radiation emitter 1 comprises a jacket tube 32, in which telescopically arranged optic components of the radiation emitter 1 are located according to the invention. Overall the radiation emitter 1 has a structure that can be aligned in two axes with high control speeds of approximately one 1 rad/s.

The secondary mirror 3 is provided at the area of the end of the jacket tube 32 opposite the collimation reflector 2, displaceable along the longitudinal axis 33 of the jacket tube 32 forming the optic axis X.

In the exemplary embodiment shown, six radiation generators 34 are provided, with FIGS. 1 and 2 showing only two of them, and which represent industrial solid state lasers with a wavelength of 1.07 μm. One skilled in the art clearly knows that more or less than six radiation generators 34 may be provided, as already explained above with reference to the energy requirements for the specific application. The radiation generators 34 each emit high-energy laser light, which is coupled, via only schematically shown light conducting devices 35 and an appropriate number of coupling devices 13, into the radiation emitter 1. The coupling devices 13 are provided in a housing 14 surrounding the jacket tube 32.

The light conducting devices 35 may represent, for example, light conducting fibers or another arbitrary device for coupling in and/or introducing radiation into the radiation emitter 1.

In the embodiment shown, the light conducting fibers 35 coaxially couple laser light via fiber plugs 8, shown only schematically, into the radiation emitter 1. In order to combine radiation of the respective laser beams, the laser radiation R emitted from the corresponding fiber plug 8 and/or the ends of the fibers is bundled via a parabolic reflector 7 each to a parallel beam with a small diameter from one to two centimeters and is emitted in the individual radiation axes as a radiation bundle 36 to a respective beam splitter 6.

From here, the radiation is deflected by a Piezo reflector 5, which can be tilted about two axes. From the tilting reflectors 5 the radiation is directed to a central beveled mirror 4, which is provided at the longitudinal axis 33 of the jacket tube 32, forming the optic axis X of the radiation emitter, adjacent to the collimation reflector 2. This beveled mirror 4 serves to direct the radiation to different sub-apertures A' (FIG. 2) of an emitting optic with a reference plate 10 provided with an appropriate emission aperture A, which is provided at the end of the jacket tube 32 facing away from the collimation reflector 2 such that the radiation S emitted is focused coaxially as effective laser beams on a target object not shown in greater detail. The number of sub-apertures A' and consequently the emission apertures A are equivalent to the number of radiation generators 34. The common focusing of the radiation occurs here via the above-mentioned axial displacement of the secondary mirror 3.

FIG. 2 of the drawing shows in a schematic illustration a top view from the front of the radiation emitter 1 according to FIG. 1. The secondary mirror 3 is embodied as a tilting reflector and has the form of a parabolic reflector.

In order to direct the radiation emitter 1 on the target object, a camera 12 is provided, which analyzes image data by a control device, not shown in greater detail, in the form of a tracking electronic and addresses and aligns the radiation emitter 1 to the target object via actuators, also not shown in greater detail.

The image data recorded by the camera 12 are used for the general alignment of the radiation emitter 1 to the target object Z, while a detailed directing of the effective laser radiation shown in FIG. 1 occurs with the help of an illuminating laser 11.

The illuminating laser 11 lights the target object Z, as shown in FIG. 3, over a large area with laser light 37, namely with a wavelength which is different from the wavelength of the effective laser. In the embodiment shown, an illuminating laser is used with a wavelength of 532 nm.

The laser light 38 reflected by the target object is collected by the collimation reflector 2 and distributed via the secondary mirror 3, the beveled reflector 4, and the Piezo tilting mirror 5 in the radiation paths of the individual coupling devices 13. In the respective radiation path, the above-mentioned beam splitters 6 are arranged, which allow the laser light 38 reflected by the target Z to pass and display it on the positioning sensors 9 used for a detailed alignment.

The source signals of these positioning sensors 9 used for detailed tracking are fed to a control device, not shown in greater detail, which detects with high precision the relative angular misalignments of the individual laser beam paths and corrects the alignment of the laser beam of the respective effective laser beam in a closed control circuit via the Piezo tilting reflectors 5 and the secondary mirror 3 embodied as a tilting reflector.

This also makes it possible to correct the angular misalignment generated by atmospheric turbulences on the travel path of the effective laser beam towards the target.

The use of the collimation reflector 2 as a receiving optic is very advantageous in that its large receiving aperture yields high optic resolution and luminosity. This is particularly beneficial when quadrant detectors or cameras are used as position sensors 9.

Via a pilot laser beam 39, coupled into the beam path of the effective laser beam, in the red spectral range of 635 nm for example, which travels the same optic path as the effective laser beam, the above-described control can also be used in case of angular misalignments for adjustment and harmonizing the individual radiation paths, as shown in FIG. 4.

Retro-reflectors 41 may be inserted into the emitting apertures A, via which the respective pilot laser radiation 39 is displayed as reflected radiation 40 on the collimation reflector 2 and therefrom via the beveled reflector 4 and the Piezo tilting reflector 5 as well as the beam splitter 6 on the position sensors 9. Based on the output signals of the position sensors 9 the angular misalignments can then be determined and corrected via the Piezo tilting reflector 5.

The radiation emitter according to the invention makes it possible, in a cost-effective fashion, to apply an effective energy on a mobile object from a distance from several hundred meters to several kilometers without it here being required to invest costly developments for specifically adapted radiation generators with the corresponding development expense.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The reference characters in the claims, the description, and the drawings only serve for a better understanding of the invention and have no limiting effect upon the scope of protection.

LIST OF REFERENCE CHARACTERS

It is marked:
1 Radiation emitter
1' Radiation combining device
2 Collimation reflector
3 Secondary mirror
4 Beveled reflector
5 Piezo tilting reflector
6 Beam splitter
7 Off-axis parabolic reflector
8 Fiber plug
9 Position sensor, quadrant detector, camera
10 Window, reference plate
11 Illuminating laser
12 Camera
13 Coupling device
14 Housing
32 Jacket tube
33 Longitudinal axis
34 Radiation generator
35 Light conducting device
36 Radiation bundle
37 Laser light
38 Reflected laser light
39 Pilot laser radiation
40 Reflected pilot laser radiation
41 Retro-reflectors

The invention claimed is:

1. A radiation emitter configured to radiate directional energy, the radiation emitter comprising:
   a radiation generator;
   a radiation combining device comprising a telescopic optic, which is configured to combine radiation into bundled radiation, the telescopic optic including a collimation reflector and a secondary mirror that is displaceable with respect to the collimation reflector along a longitudinal axis of the telescopic optic;
   a coupling device configured to couple radiation from the radiation generator into the radiation combining device in a general direction away from the secondary mirror;
   at least one reflector, which is configured to articulate about two axes; and
   a beveled reflector displaced from the collimation reflector along the optical axis,
   wherein the coupling device is configured to accept directional radiation from a plurality of light conducting devices from the radiation generator, the at least one reflector is configured to deflect radiation in a direction towards the beveled reflector, and the beveled reflector is configured to deflect radiation in a direction of the secondary mirror.

2. The radiation emitter according to claim 1, wherein the radiation emitter is configured to spatially coaxial couple radiation from at least one high-energy laser light source.

3. The radiation emitter according to claim 1, wherein the radiation emitter is configured to bundle radiation into a parallel beam via a parabolic reflector and to guide the bundled radiation in individual beam axes via a beam splitter to different sub-apertures of the telescopic optic.

4. The radiation emitter according to claim 1, further comprising:
   at least one camera;
   a control device configured to analyze image data recorded by the camera; and
   an aligning device configured to align the radiation emitter using the control device and image data.

5. The radiation emitter according to claim 1, further comprising:
   a laser device configured to illuminate a target object, wherein the laser device is configured to emit laser beams with a wavelength different from a wavelength of the radiation, and
   wherein the collimation reflector and a beveled reflector are configured to deflect laser light reflected by the target object in a direction of radiation paths of the radiation generator.

6. The radiation emitter according to claim 1, further comprising:
   a position-sensitive detector or a camera configured to record laser light reflected by the target object; and
   a control device configured to determine relative angular misalignments in the radiation paths based on data of the position-sensitive detector or the camera and correction of the misalignments via the reflector or the secondary mirror.

7. The radiation emitter according to claim 6, further comprising:
   at least one laser light source configured to emit a laser light beam coupled in the radiation path of the radiation generator with its progression being detected by the detector or the camera for adjusting radiation paths.

8. The radiation emitter according to claim 6, further comprising:
   means for emitting a light beam, directed via a wavelength-sensitive beam splitter to the position-sensitive detector or the camera, wherein the emitted light can be detected to determine angular misalignments.

* * * * *